United States Patent
Lee

(10) Patent No.: US 7,103,477 B1
(45) Date of Patent: Sep. 5, 2006

(54) SELF-CALIBRATION FOR AN INERTIAL INSTRUMENT BASED ON REAL TIME BIAS ESTIMATOR

(75) Inventor: Charles A. Lee, Camarillo, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 11/364,316

(22) Filed: Feb. 28, 2006

Related U.S. Application Data

(60) Provisional application No. 60/706,628, filed on Aug. 8, 2005.

(51) Int. Cl.
*G01C 21/28* (2006.01)

(52) U.S. Cl. .................. 701/220; 701/221; 73/488

(58) Field of Classification Search ............. 701/220, 701/221, 222, 207, 216, 217; 340/990; 342/357.01–357.17; 73/488, 490
See application file for complete search history.

(56) References Cited

U.S. PATENT DOCUMENTS

| | | | |
|---|---|---|---|
| 5,272,815 A | 12/1993 | Hane et al. | |
| 5,416,976 A | 5/1995 | Hane et al. | |
| 5,527,003 A | 6/1996 | Diesel et al. | |
| 5,562,266 A | 10/1996 | Achkar et al. | |
| 5,902,351 A * | 5/1999 | Streit et al. | 701/220 |
| 6,282,496 B1 * | 8/2001 | Chowdhary | 701/220 |
| 6,401,036 B1 | 6/2002 | Geier et al. | |
| 6,498,996 B1 | 12/2002 | Vallot | |
| 6,515,618 B1 * | 2/2003 | Lupash | 342/357.02 |
| 6,577,952 B1 * | 6/2003 | Geier et al. | 701/214 |
| 6,671,622 B1 * | 12/2003 | McCall et al. | 701/220 |
| 6,678,631 B1 * | 1/2004 | Schiffmann | 702/151 |
| 6,738,714 B1 * | 5/2004 | McCall et al. | 701/220 |
| 6,782,742 B1 | 8/2004 | Adebjork et al. | |

FOREIGN PATENT DOCUMENTS

| | | |
|---|---|---|
| EP | 1471328 | 10/2004 |
| WO | WO 98/49577 | 4/1998 |
| WO | WO 00/76251 | 12/2000 |

* cited by examiner

*Primary Examiner*—Richard M. Camby
(74) *Attorney, Agent, or Firm*—Carmen B. Patti & Assoc., LLC

(57) ABSTRACT

An exemplary inertial measurement apparatus incorporates self-calibrating bias correction signals. First and second inertial instruments generate respective input signals representative of an inertial attribute to be measured. A bias estimator generates first and second bias correction signals. First and second summation nodes receive the respective input signals and the respective first and second bias correction signals. The first and second summation nodes provide respective summed signals to the first and second inertial instruments. The first and second inertial instruments generate respective output signals representative of a value of the inertial attribute based on the respective summed signals. The bias estimator calculates the first and second bias correction signals based on first and second measurements made during respective first and second time intervals where a sign of one of the first and second bias error signals changes from one state during the first time interval to the other state during the second time interval.

14 Claims, 2 Drawing Sheets

SELF-CALIBRATION FOR AN INERTIAL INSTRUMENT BASED ON REAL TIME BIAS ESTIMATOR

CROSS REFERENCE TO RELATED APPLICATION

This application claims the benefit of U.S. Provisional Application, Ser. No. 60/706,628 filed Aug. 8, 2005, and entitled Real Time Bias Estimator Provides Compensation for Outputs of an Inertial Instrument.

BACKGROUND

This invention relates to inertial instruments, such as gyroscopes and accelerometers, and more specifically to bias error correction in such instruments.

The performance of inertial instruments is degraded by bias, a measure of the deviation of a measurement made by a non-ideal inertial instrument from a measurement made by a perfect or ideal instrument. For example, the bias of a gyroscope is determined by the difference between the gyroscope's reading at a zero angular rate and zero which would be measured by a perfect gyroscope. Bias drift is a rate of change of the bias resulting from changes such as environmental conditions over time.

One method of compensation for bias and/or bias drift in an inertial instrument is to periodically make bias correction adjustments of the inertial instrument based on information obtained from another source of known accuracy. For example, global positioning satellite (GPS) signals processed by a GPS receiver co-located with the inertial instrument can be used to determine a series of locations over known time intervals. This GPS information can be utilized to periodically recalibrate a bias error correction signal of the inertial instrument to make the output coincide with the GPS data. However, depending upon the operational environment, the reception of GPS signals is not always possible, and hence correction of the inertial instrument's output based on GPS data cannot always be relied upon. Therefore, a need exists to minimize bias and bias drift in an inertial instrument without requiring a separate source of accurate positional information such as derived from GPS information or the like.

SUMMARY

It is an object of the present invention to satisfy this need.

An exemplary inertial measurement apparatus incorporates self-calibrating bias correction signals. First and second inertial instruments generate respective input signals representative of an inertial attribute to be measured. A bias estimator generates first and second bias correction signals. First and second summation nodes receive the respective input signals and the respective first and second bias correction signals. The first and second summation nodes produce respective summed signals that are coupled to the first and second inertial instruments. The first and second inertial instruments generate respective output signals representative of a value of the inertial attribute based on the respective summed signals. The bias estimator calculates the first and second bias correction signals based on first and second measurements made during respective first and second time intervals where a sign of one of the first and second bias error signals is changed from one state during the first time interval to the other state during the second time interval.

An exemplary method implements steps as generally described above with regard to the exemplary inertial measurement apparatus.

DESCRIPTION OF THE DRAWINGS

Features of exemplary implementations of the invention will become apparent from the description, the claims, and the accompanying drawings in which:

DETAILED DESCRIPTION

One aspect of the present invention resides in the recognition of the difficulties associated with bias compensation of an inertial instrument where the compensation relies upon information that must be obtained from another source of known accuracy. Part of the recognition includes an appreciation that operating conditions of vehicles containing the inertial instrument often make obtaining information from an external source of known accuracy difficult or impossible. The exemplary self-calibrating inertial instrument in accordance with the present invention was created to overcome such difficulties. As used herein "self-calibrating" refers to the ability of an inertial instrument apparatus to provide its own bias corrections without requiring an input based on an external source of information of known accuracy. However, it will be appreciated that occasional calibrations from external sources can be utilized to confirm or reset calibration of the inertial instrument.

Figure 1:
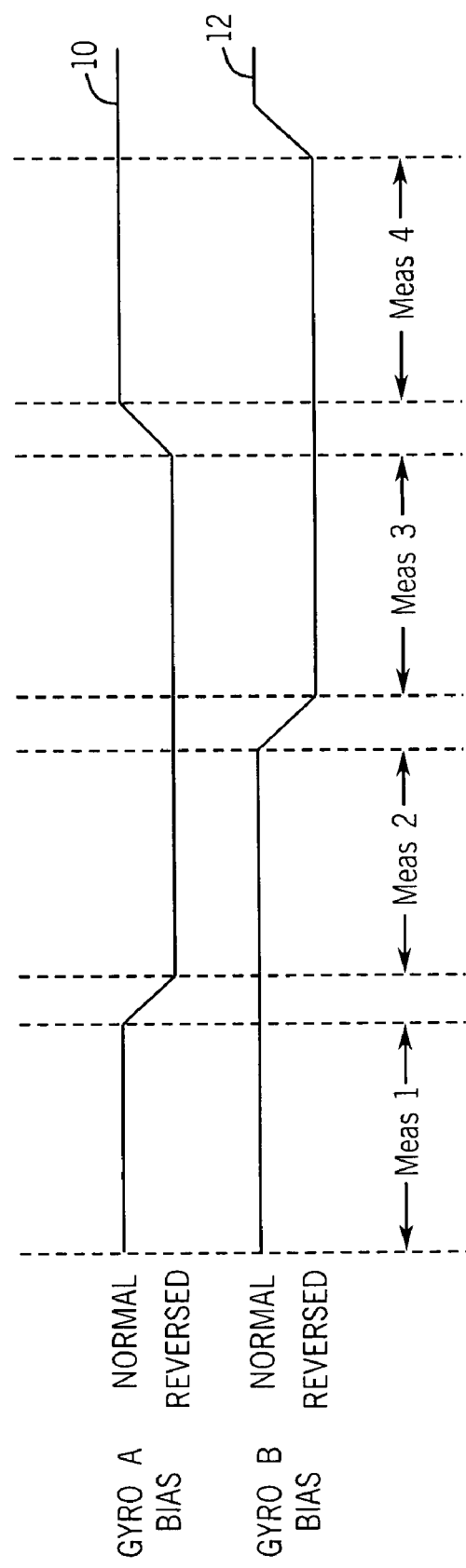
FIG. 1 is a graph illustrating the polarity of bias signals for two exemplary gyroscopes.

FIG. 1 is an exemplary graph showing bias signal error polarities 10 and 12 associated with gyroscopes A and B, respectively. Although gyroscopes are used in the described exemplary implementation, it will be apparent that any type of inertial instrument, e.g. gyroscope, accelerometer, etc., will benefit from the improvements as will be understood from the following explanation. The bias error signals provide the means for error correction for the gyroscopes so with the outputs from the gyroscopes will more accurately represent the attribute being sensed based on inputs received by the gyroscopes.

Each of bias error signals 10 and 12 have two states, normal and reversed, which correspond to the sign relationship between the sensed input value of the gyroscope and the bias error signal. For example, a+relationship represents that the bias signal is added to the sensed input signal and a−relationship represents that the bias signal is subtracted from the sensed input signal. The "normal" relationship can be either in a+ or −relationship depending upon the type of error correction to be implemented. The "reversed" relationship represents the opposite sign from the normal relationship. In this example, normal and reversed correspond to a + and −relationship, respectively.

The graph represents four different measurement intervals, Meas 1–Meas 4. Each measurement interval represents one of the four different state combinations of the bias error signals 10 and 12. Each bias error signal has two states, normal and reversed. During the operation of the gyroscopes A and B, the respective bias error signals 10 and 12 can be sequenced between normal and reversed conditions so that all four different state combinations represented by the four different measurement intervals occur. Depending upon the particular application and the sampling time at which the outputs of the gyroscopes are utilized, the rate of the sequencing can be adjusted to meet the particular application. As will be explained in more detail below, information obtained during two measurement intervals is utilized as part of the self-calibration process and hence the rate of sequencing will define the maximum rate at which new calibration information can be calculated. Although it may be desirable to sequence through all four combinations of states as shown in FIG. 1 with corresponding calculations for bias error, two time intervals with a change of sign of one of the two bias signals will yield sufficient information to make a bias error calculation.

Figure 2:
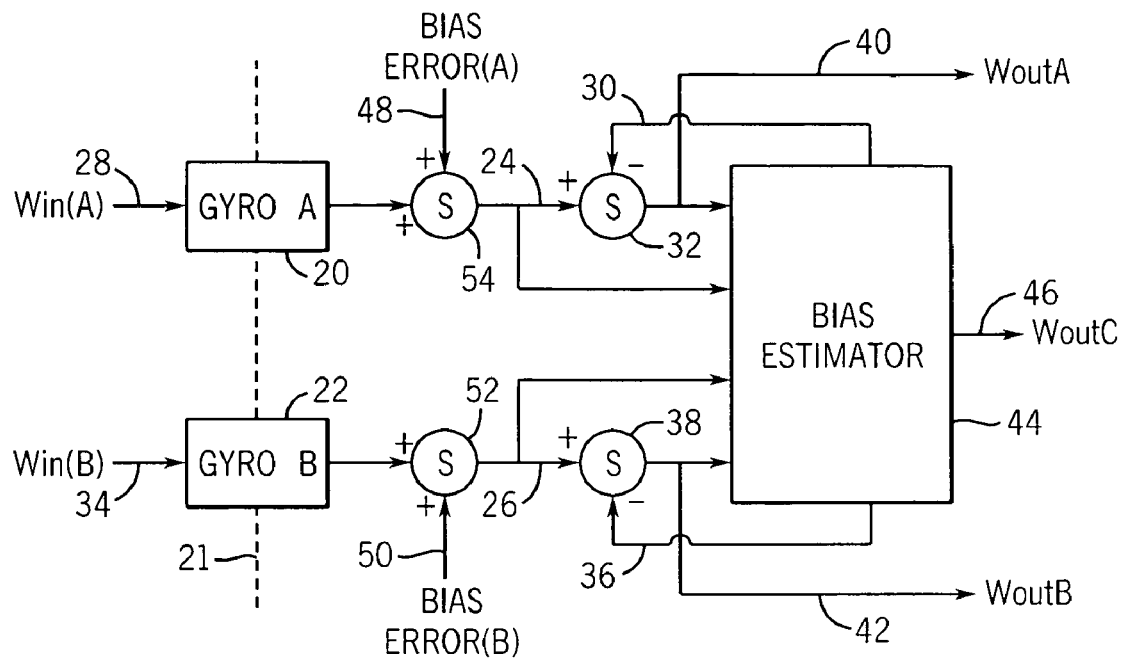
FIG. 2 is a representative diagram of an exemplary embodiment of the present invention.

FIG. 2 is an exemplary block diagram of an illustrative embodiment of a self-calibrating inertial instrument in accordance with the present invention. As used herein, the same reference numeral may be utilized to refer to an input line as well as the input signal carried by the line; the appropriate meaning will be clear from the context. Inertial instruments 20 and 22 receive respective input signals 28 and 34 representing the attribute to be measured. In this example, the attribute being measured by the gyroscopes is angular position such as measured in degrees. It will be understood that this diagram is provided to assist in explanation of the operation of an embodiment of the present invention and does not identically correspond to physical structure. For example, inputs 24 and 26 will normally be generated by devices within the inertial instruments 20 and 22, and the summation nodes may also be internal to the inertial instruments. The inertial instruments 20 and 22 are oriented relative to each other to share a common axis or plane 21 relative to the attribute being measured. Thus, if the inertial instruments 20 and 22 were perfect, each would produce an identical output value since each senses the same attribute having the same orientation relative to the attribute being sensed. For example, if the inertial instruments were gyroscopes, each gyroscope (assuming each was a perfect gyroscope) would produce an output with the same value in degrees.

The input 24 is a combination of a sensed input signal 28 combined with a bias signal 48 (BiasA) by summation node 54. Similarly, input 26 is a combination of a sensed input signal 34 combined with a bias signal 50 (BiasB) by summation node 52. The bias signals 30 and 36 are utilized to provide error correction resulting in more accurate outputs 40 and 42 by inertial instruments 20 and 22, respectively. A bias estimator 44 receives the inputs 24 (MeasA) and 26 (MeasB) as well as the outputs 40 and 42. The bias generator generates the error correction bias signals 30 and 36. It also generates a computed output value 46 that may comprise output 40, output 42, or combination of outputs 40 and 42 as will be explained below.

The elements shown in FIG. 2 do not have to be implemented as discrete components. For example, two separate inertial instruments could each contain all of the necessary components with the required information being shared between respective bias estimators contained in each inertial instrument. Alternatively, all of the required functions could be contained in a single integrated device which would contain functionality for two inertial instruments and the bias estimator.

The bias errors may be directly observable if two instruments, gyroscopes (gyros) in this exemplary embodiment, are located along the same axis relative to the attribute being sensed and are sequenced as described. Both gyros are operating stabilized over each of the measurement intervals Meas 1 through Meas 4. Both gyros sense rotations about the same axis. The measurement MeasA and MeasB made by gyros A and B during each $i^{th}$ measurement interval are:

$$MeasA(i) = Win(i) +/- BiasA \quad (Eq\ 1)$$

$$MeasB(i) = Win(i) +/- BiasB \quad (Eq2)$$

For the first and second intervals, $$MeasA(1) = Win(1) + BiasA \quad (Eq3)$$

$$MeasB(1) = Win(1) + BiasB \quad (Eq4)$$

$$MeasA(2) = Win(2) - BiasA \quad (Eq5)$$

$$MeasB(2) = Win(2) + BiasB \quad (Eq6)$$

Or (Eq7):

$$\begin{pmatrix} MeasA(1) \\ MeasB(1) \\ MeasC(2) \\ MeasD(2) \end{pmatrix} = \begin{pmatrix} 1 & 0 & 1 & 0 \\ 1 & 0 & 0 & 1 \\ 0 & 1 & -1 & 0 \\ 0 & 1 & 0 & 1 \end{pmatrix} * \begin{pmatrix} Win(1) \\ Win(2) \\ BiasA \\ BiasB \end{pmatrix}$$

Which is of the form:

$$z = [H]*x \quad (Eq8)$$

The [H] matrix is non singular as indicated by (Eq9):

$$[H^{-1}] = \begin{pmatrix} 0.5 & 0.5 & 0.5 & -0.5 \\ 0.5 & -0.5 & 0.5 & 0.5 \\ 0.5 & -0.5 & -0.5 & 0.5 \\ -0.5 & 0.5 & -0.5 & 0.5 \end{pmatrix}$$

The four variables, Win(1), Win(2), BiasA and BiasB are therefore individually observable:

$$x = [H^{-1}]*z \quad (Eq10)$$

Expanded in Eq11 as:

$$\begin{pmatrix} Win(1) \\ Win(2) \\ BiasA \\ BiasB \end{pmatrix} = \begin{pmatrix} 0.5 & 0.5 & 0.5 & -0.5 \\ 0.5 & -0.5 & 0.5 & 0.5 \\ 0.5 & -0.5 & -0.5 & 0.5 \\ -0.5 & 0.5 & -0.5 & 0.5 \end{pmatrix} * \begin{pmatrix} MeasA(1) \\ MeasB(1) \\ MeasC(2) \\ MeasD(2) \end{pmatrix}$$

With regard to the illustrative embodiment, a digital implementation will contain counts, i.e. numerical values, corresponding to inputs and outputs of the inertial instrument measurements from two parallel instrument inputs/channels Win(A) and Win(B). These inputs will have been compensated for any scale factor differences that may exist between the two gyros. The bias estimator 44 preferably processes the required inputs and generates outputs in substantially real time. The bias estimator supports a self-biasing function and computes values for bias signals 30 and 36 in accordance with the above description. A filter, which may comprise part of the bias estimator, is preferably used to compute smoothed values of bias signals 30 and 36 such as by computing an average over several samples. Bias compensated measurements Wout(A) and Wout(B) comprise system inertial measurement data/values that are supplied to external devices for use in calculating other functions/parameters. Also output Wout(C), which may be computed by the bias estimator, is preferably supplied to the external devices. Output Wout(C) is an average of Wout(A) and Wout(B) when both are available, i.e. when neither is in a bias polarity transition period as exists between the measurement intervals, and uses only one of Wout(A) and Wout(B) when the other is in a bias polarity transition period.

The above implementation, described in terms of a gyroscope, is equally applicable to a pair of parallel accelerometers having the same reversibility between sensed input and bias error.

Figure 3:
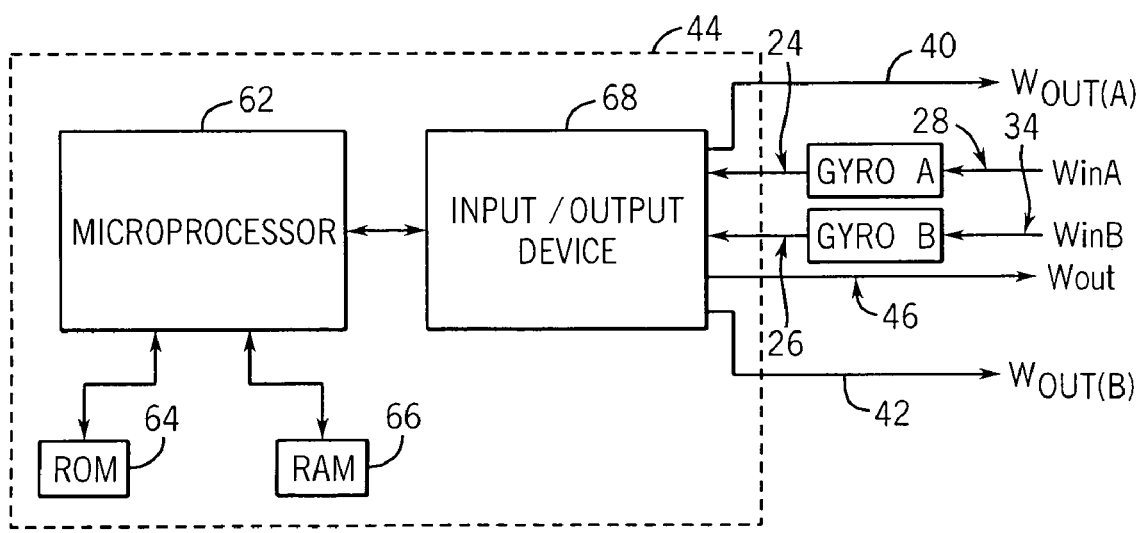
FIG. 3 is a block diagram of the exemplary bias estimator as shown in FIG. 2.

FIG. 3 is a block diagram of an exemplary bias estimator 44. A microprocessor 62 is supported by read-only memory (ROM) 64 and a random access memory (RAM) 66. Microprocessor 62 is coupled to an input/output module 68 that supports receiving and transmitting digital signals as shown. The microprocessor 62 operates under stored program control instructions preferably contained initially in ROM 64. Operational instructions as well as data are stored in RAM 66 for processing by microprocessor 62. Those skilled in the art will understand how to provide appropriate control instructions for microprocessor 62 in order to implement the functions and calculations discussed above. Comparing FIGS. 2 and 3, the summation points 32 and 38 are implemented by software running on microprocessor 62, and the "Gyro A" and "Gyro B" of FIG. 3 include the summation points 54 and 52, respectively, as shown in FIG. 2. Alternatively, the functions and calculations can be implemented in an application specific integrated circuit or other form of hardware implementation. In addition to the functionality and calculations required by the bias estimator, additional functionality required by the inertial instruments could be incorporated into a single device.

Although exemplary implementations of the invention have been depicted and described in detail herein, it will be apparent to those skilled in the art that various modifications, additions, substitutions, and the like can be made without departing from the spirit of the invention. For example, some alternatives have been described above.

The scope of the invention is defined in the following claims.

We claim:

1. An inertial measurement apparatus comprising:
   first and second inertial instruments adapted to generate respective sensed signals representative of an inertial attribute to be measured;
   means adapted to combine first and second bias error signals with the respective sensed signals thereby generating respective output signals;
   bias estimator adapted to receive said output signals and generate respective first and second bias correction signals corresponding to the first and second inertial instruments;
   the bias estimator calculating the first and second bias correction signals based on first and second measurements made during respective first and second time intervals where a sign of one of the first and second bias error signals changes from one state during the first time interval to the other state during the second time interval;
   bias estimator adapted to generate first and second corrected output signals based on a combination of the first and second bias correction signals with the respective output signals.

2. The apparatus of claim 1 wherein the bias estimator calculates the first and second bias correction signals based on first and second measurements made during respective first and second time intervals where a sign of the other of the first and second bias correction signals does not change state during the first and second time intervals.

3. The apparatus of claim 2 wherein the bias estimator calculates the first and second bias correction signals based on equations Eq3, Eq4, Eq5 and Eq6.

4. The apparatus of claim 1 wherein the first and second inertial instruments have the same physical orientation relative to the inertial attribute to be measured, so that the first and second inertial instruments are measuring the same inertial attribute.

5. The apparatus of claim 1 wherein the bias estimator generates a third corrected output signal representative of a value of the inertial attribute, where the third output signal is an average of the respective output signals of the first and second inertial instruments when the sign of neither of the first and second bias correction signals is changing, the third corrected output signal being selected to represent the inertial attribute of one of the first and second inertial instruments when the other of the first and second inertial instruments has a respective bias correction signal with its sign undergoing a change of states.

6. An inertial measurement apparatus comprising:
   first and second means for generating respective sensed signals representative of an inertial attribute to be measured;
   means adapted to combine first and second bias error signals with the respective sensed signals thereby generating respective output signals;
   bias estimator means, adapted to receive said output signals, for generating respective first and second bias correction signals corresponding to the first and second means;
   the bias estimator means calculating the first and second bias correction signals based on first and second measurements made during respective first and second time intervals where a sign of one of the first and second bias error signals changes from one state during the first time interval to the other state during the second time interval;
   bias estimator means adapted to generate first and second corrected output signals based on a combination of the first and second bias correction signals with the respective output signals.

7. The apparatus of claim 6 wherein the bias estimator means calculates the first and second bias correction signals based on first and second measurements made during respective first and second time intervals where a sign of the other of the first and second bias correction signals does not change state during the first and second time intervals.

8. The apparatus of claim 7 wherein the bias estimator means calculates the first and second bias correction signals based on equations Eq3, Eq4, Eq5 and Eq6.

9. The apparatus of claim 6 wherein the first and second means each comprise inertial instruments that have the same physical orientation relative to the inertial attribute to be measured, so that the first and second means are measuring the same inertial attribute.

10. The apparatus of claim 6 wherein the bias estimator means generates a third corrected output signal representative of a value of the inertial attribute, where the third output signal is an average of the respective output signals of the first and second means when the sign of neither of the first and second bias correction signals is changing, the third corrected output signal being selected to represent the inertial attribute of one of the first and second means when the other of the first and second means has a respective bias correction signal with its sign undergoing a change of states.

11. A method for utilizing self-calibrating bias signals in an inertial measurement apparatus comprising:

generating first and second sensed signals each representative of a same inertial attribute to be determined, where each of the first and second sensed signals is generated based on the same parameters sensed at the same location;

combining first and second bias error signals with the respective first and second sensed signals to generate respective first and second output signals;

generating first and second bias correction signals that correspond to the respective first and second output signals;

calculating the first and second bias correction signals based on measurements made during first and second time intervals where a sign of the first bias error signal is changed from one state during the first time interval to another state during the second time interval;

generating first and second corrected output signals representative of a value of the inertial attribute based on the first and second output signals and the first and second bias correction signals, respectively.

12. The method of claim 11 wherein the calculating step comprises calculating the first and second bias correction signals based on first and second measurements made during respective first and second time intervals where a sign of the second bias correction signal does not change state during the first and second time intervals.

13. The method of claim 12 wherein the calculating step comprises calculating the first bias correction signal based on equations Eq3, Eq4, Eq5 and Eq6.

14. The method of claim 11 further comprising the step of generating a third corrected output signal representative of a value of the inertial attribute, where the third corrected output signal is an average of the first and second corrected output signals when the sign of neither of the first and second bias correction signals is changing, the third corrected output signal being selected to represent the inertial attribute of one of the first and second corrected outputs when the other of the of the first and second corrected output signals has a corresponding bias correction signal with its sign undergoing a change of state.

* * * * *